United States Patent [19]

Martin et al.

[11] Patent Number: 5,306,775
[45] Date of Patent: Apr. 26, 1994

[54] POLYETHYLENE BLENDS

[75] Inventors: Joel L. Martin; M. Bruce Welch; William R. Coutant; Max P. McDaniel, all of Bartlesville, Okla.

[73] Assignee: Phillips Petroleum Company, Bartlesville, Okla.

[21] Appl. No.: 48,628

[22] Filed: Apr. 16, 1993

Related U.S. Application Data

[63] Continuation-in-part of Ser. No. 761,604, Sep. 18, 1991, abandoned.

[51] Int. Cl.$^5$ .............. C08L 23/06; C08L 23/16; C08L 23/08
[52] U.S. Cl. .......................................... 525/240
[58] Field of Search ................................. 525/240

[56] References Cited

U.S. PATENT DOCUMENTS

| | | | |
|---|---|---|---|
| 3,127,370 | 3/1964 | Head | 525/240 |
| 3,179,720 | 4/1965 | Hilmer | 525/240 |
| 4,336,352 | 6/1982 | Sakurai et al. | 525/240 |
| 4,536,550 | 8/1985 | Moriguchi et al. | 525/240 |
| 4,603,173 | 7/1986 | Mack et al. | 525/240 |
| 4,617,352 | 10/1986 | Page et al. | 525/240 |
| 4,824,912 | 4/1989 | Su | 525/240 |
| 4,835,219 | 5/1989 | Tajima et al. | 525/240 |
| 4,840,996 | 6/1989 | Wild et al. | 525/240 |
| 4,842,922 | 6/1989 | Krupp et al. | 525/240 |
| 4,954,391 | 9/1990 | Kotani et al. | 525/240 |

FOREIGN PATENT DOCUMENTS

| | | |
|---|---|---|
| 61-057638 | 3/1986 | Japan . |
| 790115 | 2/1958 | United Kingdom . |

OTHER PUBLICATIONS

Modern Plastics-1963 ED–pp. 227–1962.

Primary Examiner—Carman J. Seccuro, Jr.
Attorney, Agent, or Firm—Carl D. Corvin

[57] ABSTRACT

A composition of matter comprising: (a) 30 to 70 weight percent inclusive of a low molecular weight ethylene resin made using a chromium catalyst system said resin having a density of at least 0.955 grams per cubic centimeter, a melt index from 25 to 400 grams per 10 minutes, and a heterogeneity index between 2 and 35 inclusive; and (b) 30 to 70 weight percent inclusive of a high molecular weight ethylene copolymer resin made using a titanium catalyst system said resin having a density not greater than 0.955 grams per cubic centimeter, a high load melt index between 0.1 and 50 grams per 10 minutes inclusive, and a heterogeneity index between 2 and 10 inclusive; wherein said composition of matter has a melt index greater than 0.05 grams per 10 minutes.

10 Claims, No Drawings

POLYETHYLENE BLENDS

CROSS-REFERENCE TO RELATED APPLICATION

This patent application is a continuation-in-part of patent application Ser. No. 07/761,604 which was filed on Sep. 18, 1991, now abandoned, the entire disclosure of which is hereby incorporated by reference.

BACKGROUND OF THE INVENTION

This invention relates to polyethylene blends.

It is known in the art to blend components with dissimilar characteristics to achieve a blend with superior performance properties. However, this task is not easy to accomplish. For example, the components of a blend can interact antagonistically resulting in a lowering of the expected performance of the blend, or the components can interact producing a blend that is only the mere aggregation of the separate component parts.

Thermoplastic blends are very desirable for applications such as pipes, films, and bottles. However, each application requires a resin tailored for that particular application. Furthermore, each of these tailored resins is judged by many performance attributes. While it is possible to improve one attribute, it is often necessary to find a compromise of the various attributes in order to find a resin which fulfills the customers requirements.

This invention provides an improved compromise of characteristics thereby increasing the availability of possible solutions to consumer demands.

SUMMARY OF THE INVENTION

It is an object of this invention to provide an improved polyethylene blend.

It is a another object of this invention to provide a polyethylene blend with an improved environmental stress crack resistance.

These and other objects of this invention will become apparent to those skilled in the art from the following detailed description of the invention.

In accordance with this invention, a composition of matter is provided comprising: (a) 30 to 70 weight percent inclusive of a low molecular weight ethylene resin made using a chromium oxide based catalyst system said resin having a density of at least 0.955 grams per cubic centimeter, a melt index from 25 to 400 grams per 10 minutes and, a heterogeneity index between 2 and 35 inclusive; and (b) 30 to 70 weight percent inclusive of a high molecular weight ethylene copolymer resin made using a titanium chloride based catalyst system said resin having a density not greater than 0.955 grams per cubic centimeter, a high load melt index between 0.1 and 50 grams per 10 minutes inclusive, and a heterogeneity index between 2 and 10 inclusive; wherein said composition of matter has a melt index greater than 0.05 grams per 10 minutes.

In another embodiment this invention provides a composition of matter comprising: (a) 30 to 70 weight percent inclusive of a low molecular weight ethylene resin made using a chromium oxide based catalyst system said resin having a density of at least 0.955 grams per cubic centimeter, a melt index from 25 to 400 grams per 10 minutes, and a heterogeneity index between 7 and 35 inclusive; and (b) to 30 to 70 weight percent inclusive of a high molecular weight ethylene copolymer resin made using a titanium chloride based catalyst system said resin having a density not greater than 0.955 grams per cubic centimeter, a high load melt index between 0.1 and 50 grams per 10 minutes inclusive, and a heterogeneity index between 2 and 10 inclusive; wherein said composition of matter has a melt index greater than 0.05 grams per 10 minutes.

In yet another embodiment this invention provides a composition of matter comprising: (a) 30 to 70 weight percent inclusive of a low molecular weight ethylene resin made using a chromium oxide based catalyst system said resin having a density of at least 0.955 grams per cubic centimeter, a melt index from 25 to 400 grams per 10 minutes, and a heterogeneity index between 2 and 35 inclusive; and (b) 30 to 70 weight percent inclusive of a high molecular weight ethylene copolymer resin made using a titanium chloride based catalyst system said resin having a density not greater than 0.955 grams per cubic centimeter, a high load melt index between 1.5 and 50 grams per 10 minutes, and a heterogeneity index between 2 and 10 inclusive; wherein said composition of matter has a melt index greater than 0.05 grams per 10 minutes.

In still yet another embodiment of this invention a composition of matter is provided comprising:

(a) 30 to 70 weight percent of a low molecular weight ethylene homopolymer resin, where said resin is made by polymerizing ethylene with a chromium oxide based catalyst system, and where said resin has a density greater than 0.96 grams per cubic centimeter, a melt index greater than 30 grams per 10 minutes, a heterogeneity index from 2 to 35, and a high load melt index/melt index ratio less than 40, (b) 30 to 70 weight percent of a high molecular weight ethylene copolymer resin, where said resin is made by copolymerizing ethylene and an alpha-olefin with a titanium chloride based catalyst system, and where said resin has a density less than 0.955 grams per cubic centimeter, a high load melt index from 0.1 to 50 grams per 10 minutes, and a heterogeneity index from 2 to 10, where said weight percent are based on the total weight of said resins (a) and (b); and wherein said composition of matter has a melt index greater than 0.05 grams per 10 minutes and is essentially free of other ethylene polymers.

DETAILED DESCRIPTION OF THE INVENTION

The composition of this invention comprises two components. The first component comprises a low molecular weight polyethylene resin made using a chromium oxide based catalyst system. The second component comprises a high molecular weight polyethylene resin made using a titanium chloride based catalyst system. These two components are blended together to provide a polyethylene blend which has desirable properties. Further information concerning the characteristics of these two components is given below.

Polyethylene is a thermoplastic material available in a wide range of flow rates and densities. Polyethylene offers useful properties such as toughness at a variety of temperatures, stiffness ranging from flexible to rigid, as well as excellent chemical resistance. Currently, polyethylene can be fabricated and processed by most known thermoplastic processes in the art.

Polyethylene is generally classified primarily on the basis of two characteristics, namely, density and flow rate (commonly identified as melt index). ASTMD 1248-84 (reapproved 1989) provides a convenient system for categorizing polyethylene resins. First, polyethylenes are generally classified according to density: type I polyethylene has a nominal density between 0.910–0.925 grams/cubic centimeter (g/cm$^3$); type II polyethylene has a nominal density between 0.926–0.940 g/cm$^3$; type III polyethylene has a nominal density between 0.941–0.959 g/cm$^3$; and type IV polyethylene has a nominal density of 0.960 g/cm$^3$ or above. Type I polyethylene is usually classified as a low density resin. Type II polyethylene is usually classified as a medium density resin. Type III and IV polyethylenes are usually classified as high density resins.

Within each density type there exists five different categories of flow rates. A category 1 polyethylene has a nominal flow rate greater than 25 g/10 min. at a temperature of 190° C. and under a 2160 gram weight load. A category 2 polyethylene has a nominal flow rate greater than 10 and up to and including 25 g/10 min. A category 3 polyethylene has a nominal flow rate greater than 1 up to and including 10 g/10 min. A category 4 polyethylene resin has a nominal flow rate greater than 0.4 up to an including 1.0 g/10 min. A category 5 polyethylene resin has a nominal flow rate equal to or less than 0.4 g/10 min.

These types and categories of polyethylene can be made by various processes known in the art. For example, types I and II polyethylene can be made by a high pressure process which uses oxygen, peroxide and/or other strong oxidizers as a catalyst. Pressures of reaction ranging from 100 to 350 MPa are typically employed. Polyethylene formed in these types of processes are highly branched with short side chains occurring every 15 to 40 carbon atoms on the polymer backbone chain. Furthermore, the crystallinity of these types of polyethylene is approximately 40 to 60 percent with the amorphous content of the polymer increasing as the density is reduced.

On the other hand, type I, II, III, and IV polyethylene can be produced from such processes as slurry, solution, or gas phase processes. These processes are generally known as low pressure processes. Catalysts used in these processes vary widely, but the most frequently used are transition metals in combination with metal halides or activated metal oxides. Reaction pressures normally fall within 0.25 MPa to 6 MPa. The polyethylene produced by these types of processes is more linear in nature, that is, little or no long chain branching occurs. Linear polyethylene of types I and II are approximately 50 percent crystalline whereas type III and IV's crystallinity can be as high as 85 percent or more. Generally, polyethylene made by a low pressure process which have a density below 0.960 are made by polymerizing ethylene with a small amount of comonomer such as propylene, 1-butene and/or 1-hexene.

Low Molecular Weight Polyethylene Resin

The low molecular weight polyethylene resin must be produced by a chromium oxide based catalyst system. Exemplary chromium chloride based catalyst systems are broadly disclosed in U.S. Pat. Nos. 3,887,494; 3,900,457; 3,976,632; 4,053,436; 4,151,122; 4,177,162; 4,248,735; 4,294,724; 4,364,839; 4,364,841; 4,364,842; 4,392,900; 4,405,501; 4,424,139; and 4,489,172; which are hereby incorporated by reference.

The low molecular weight polyethylene resin can be any new or recycled ethylene resin. However, it is preferred if the low molecular weight ethylene polymer is a homopolymer. This is because of the better stiffness that can be imparted to the ethylene blend by this ethylene component. Additionally, it is preferred if the low molecular weight ethylene polymer is made by polymerizing ethylene with a chromium oxide based catalyst system. It is also preferred that this chromium oxide catalyst system has been reduced and reoxidized such as in U.S. Pat. No. 4,151,122 incorporated above. This is because this type of catalyst system produces polymers that have a high load melt index/melt index (HLMI/MI) ratio less than 40 when the melt index is greater than 30 grams per 10 minutes. It is preferred that this catalyst system be used in a slurry polymerization system to produce the low molecular weight ethylene resin because of the low heterogeneity values of about 3-9 that are generated. Generally, the characteristics of the low molecular weight polyethylene resin are those listed below in Table I.

TABLE I

| Low Molecular Weight Polyethylene Resin Characteristics | | | |
| --- | --- | --- | --- |
| Characteristic | Broad Range | Preferred Range | Most Preferred Range |
| Density[1] | D ≧ 0.95 | D ≧ 0.96 | 0.96 ≦ D ≦ 0.98 |
| Heterogeneity Index[2] | 2 ≦ H.I. ≦ 35 | 2 ≦ H.I. ≦ 15 | 2 ≦ H.I. ≦ 12 |
| Melt Index[3] | 25 < M.I. ≦ 400 | 25 < M.I. ≦ 200 | 25 < M.I. ≦ 100 |
| Weight Percent[4] | 30 ≦ W.P. ≦ 70 | 40 ≦ W.P. ≦ 65 | 45 ≦ W.P. ≦ 60 |

[1] The Density is in grams per cubic centimeter.
[2] The Heterogeneity Index is an indication of the molecular weight distribution. This is a valuable indication of a resin's usefulness in certain applications. It is equivalent to the weight average molecular weight divided by the number average molecular weight.
[3] The Melt Index is in grams per 10 minutes at FR-190/2.16.
[4] The Weight Percent is based on the total weight of the low molecular weight polyethylene resin and the high molecular weight polyethylene resin.

In another embodiment of this invention it is preferred if the low molecular weight ethylene homopolymer resin is from 45 to 50 weight percent where the weight percent of the resin is based on the weight of low molecular weight ethylene homopolymer resin and the high molecular weight ethylene copolymer resin.

The low molecular weight polyethylene resin generally has a very low environmental stress crack resistance (ESCR).

High Molecular Weight Polyethylene Resin

The high molecular weight polyethylene resin must be produced by a titanium chloride based catalyst system. Exemplary titanium chloride based catalyst systems are broadly described in U.S. Pat. Nos. 4,394,291; 4,236,988; and 4,347,158; which are hereby incorporated by reference.

The high molecular weight polyethylene resin can be any new or recycled ethylene copolymer resin. This is because of the better environmental stress crack resistance that can be imparted to the ethylene blend by this ethylene component. The comonomer used to produce the copolymer is generally an alpha olefin with about 3 to about 20 carbon atoms per molecule. Preferably, the comonomer has from about 3 to about 10 carbon atoms per molecule and most preferably from 3 to 8 carbon atoms per molecule. Examples of alpha-olefins useful in this invention as comonomers are propylene, 1-butene, 3-methyl-1-butene, 1-pentene, 3-methyl-1-pentene, 4-methyl-1-pentene, 1-hexene, 3-ethyl-1-hexene, and 1-octene. The amount of comonomer will generally comprise less than about 40 weight percent of the high molecular weight resin. Preferably, the high molecular weight ethylene copolymer will comprise from about 0.001 to about 30 weight percent comonomer, and most preferably will comprise from 0.01 to 15 weight percent comonomer. Generally, the characteristics of the high molecular weight ethylene copolymer resin are those listed below in Table II.

present, will not substantially change the molecular weight distribution of the composition of matter. For example, if other ethylene polymers are present they will generally be less than 5 weight percent, preferably less than 2 weight percent, and most preferably less than 1 weight percent, of the composition of matter, where the weight percent is based on the total weight of the composition of matter.

EXAMPLES

This example is provided to further assist a person skilled in the art with understanding this invention. The particular reactants, conditions, and the like, are intended to be generally illustrative of this invention and are not meant to be construed as unduly limiting the reasonable scope of this invention.

The following test methods were used to determine the properties of the polyethylene samples.

(1) The density was determined in accordance with ASTMD 1505-85. This is a standard test method for

TABLE II

| High Molecular Weight Polyethylene Resin Characteristics | | | |
| --- | --- | --- | --- |
| Characteristic | Broad Range | Preferred Range | Most Preferred Range |
| Density[1] | $D \leq 0.955$ | $0.91 \leq D \leq 0.95$ | $0.915 \leq D \leq 0.945$ |
| Heterogeneity Index[2] | $2 \leq H.I. \leq 10$ | $2 \leq H.I. \leq 8$ | $2 \leq H.I. \leq 6$ |
| High Load[3] Melt Index | $0.1 \leq H.L.M.I. \leq 50$ | $0.2 \leq H.L.M.I. \leq 20$ | $0.2 \leq H.L.M.I. \leq 10$ |
| Weight Percent[4] | $30 \leq W.P. \leq 70$ | $35 \leq W.P. \leq 60$ | $40 \leq W.P. \leq 55$ |

[1]See footnote in Table I.
[2]See footnote in Table I.
[3]The High Load Melt Index is in grams per 10 minutes at FR 190/21.60.
[4]See footnote 4 in Table I.

In another embodiment of this invention the density of the high molecular weight polyethylene resin is between 0.935 and 0.945 g/cm inclusive. The high molecular weight polyethylene resin generally has a very high ESCR. Usually the ESCR of these polymers are so high that they cannot be practically measured.

Blending of Components

The blending of the components can be accomplished by any method known in the art which produces a homogeneous phase blend from two polymer resins. Standard polymer processing equipment can be used to make these blends such as, for example, single crew extruders, twin screw extruders, and continuous mixers. Additionally, during blending, other components can be added to the blend. These components can be antioxidants, UV stabilizers, preservatives and processing aids such as fluoroelastomers. After blending it is important that the resin be easy to process. Generally, this means that the melt index of the polymer bend needs to be greater than 0.05 grams per 10 minutes. Preferably, the melt index of the polymer blend is from 0.1 to 5 grams per 10 minutes ($0.1 \leq M.I. \leq 5$). Additionally, it is preferred if the ratio of the high load melt index to the melt index of the blend be less than 60, preferably from about 20 to about 50.

Furthermore, it is preferred, if the composition of matter comprising the ethylene homopolymer resin and the ethylene copolymer resin, is essentially free of any other ethylene polymers. The phrase "essentially free" means for the purposes of this specification that the composition of matter has only trace amounts of other ethylene polymers in its composition as impurities, and/or has only small amounts of ethylene polymers as additives. Generally, these other ethylene polymers, if determining the density of plastics. The density is reported in grams per cubic centimeter ($D = g/cm^3$).

(2) The flow rate was determined in accordance with ASTMD 1238-65T. This is a standard test method for determining the flow rate of a thermoplastic. Two different conditions were used to determine the flow rate. Condition 1 consisted of a temperature of 190° C. and a total load of 2.16 kilograms (FR-190/2.16) which is also called the melt index. Condition 2 consisted of a temperature of 190° C. and a total load weight of 21.60 kilograms (FR-190/21.60) which is also called the high load melt index. The flow rate is reported as the rate of extrusion in grams per 10 minutes (g/10 min.).

(3) The environmental stress crack resistance was determined in accordance with ASTMD 1693-70. This is a standard test method for determining the environmental stress cracking resistance of ethylene plastics. The test specimens were prepared by the following procedure ASTMD 1928-80 procedure C. The condition that the test was run at was condition A. The ESCR is reported in hours.

(4) The heterogeneity index (Mw/Mn), which is the weight average molecular weight (Mw) divided by the number average molecular weight (Mn), was determine using data collected by gel permeation chromatography. This gel permeation chromatography was accomplished with a Waters 150C chromatograph at 140° C. with 1,2,4-trichlorobenzene as a solvent. This is a standard test method for determining weight and number average molecular weights and molecular weight distributions.

Blend Preparation

The low molecular weight polyethylene resin and the high molecular weight polyethylene resin were stabilized with 0.05 weight percent of BHT (butylated hydroxytoluene), 0.03 weight percent of DLTDP (dilauryl thiodipropionate), and 0.04 weight percent calcium stearate based on the total weight of the resin. These two polyethylene resins were premixed in a container by agitation then they were placed in a mixer for more complete blending. The blending was conducted in a Midget Banbury mixer at a temperature between 150° C.-160° C. for approximately 5 minutes at a mixing speed of 130 rpm and any large pieces were then ground in a mill.

TABLE E1

| | Low Molecular Weight Polyethylene Resins[2] | | |
|---|---|---|---|
| Number | Melt Index | Density[1] (Calc.) | Mw/Mn |
| L1 | 107 | 0.9740 | 5.4 |
| L2 | 31 | 0.9710 | 7.5 |

[1]Densities were calculated from resins with similar physical properties.
[2]Both resins were made with chromium oxide based catalyst systems.

TABLE E2

| | High Molecular Weight Polyethylene Resins[1] | | |
|---|---|---|---|
| Number | HLMI | Density | Mw/Mn |
| H1 | 2.1 | 0.9410 | 5.4 |
| H2 | 1.1 | 0.9425 | 3.9 |

[1]Both resins were made with titanium chloride based catalyst systems.

TABLE E3

| | Polymer Blend | | | | |
|---|---|---|---|---|---|
| Blend Number | HLMI | Melt Index | HLMI MI | Density | ESCR |
| B1 (47%L1 + 53%H1) | 29 | 0.49 | 59 | 0.9594 | >1000 (Condition A) |
| B2 (56%L2 + 44%H2) | 62 | 0.80 | 77.5 | 0.9611 | 637 (Condition A) |

TABLE E4

| | Comparison Polymers | | |
|---|---|---|---|
| Number | Melt Index | Density | ESCR |
| C1 | 0.35 | 0.955 | 45 |
| C2 | 0.75 | 0.964 | 15-20 |

Comparison Polymers C1 and C2 are polyethylene resins made from a chromium catalyst system. They are commercially available polyethylene resins from the Phillips Petroleum Company as HHM 5502, and EHM 6007, respectively.

TABLE E5

| | Polymer Blends for Comparison Purposes | | | | | | | | |
|---|---|---|---|---|---|---|---|---|---|
| | Low Molecular Weight Component | | | High Molecular Weight Component | | | Blend | | |
| Blend | Weight Percent | Density | Melt Index | Weight Percent | Density | High Load Melt Index | ESCR | Density | High Load Melt Index |
| CB1[1] | 52 | 0.9676 | 33 | 48 | 0.9500 | 1.7 | 127 | 0.9620 | 43 |
| CB2[2] | 46 | 0.9714 | 96 | 54 | 0.9451 | 3.1 | 355 | 0.9590 | 31 |
| CB3[3] | 50 | 0.9676 | 33 | 50 | N.R. | 2.1 | 57 | 0.9638 | 27 |
| CB4[4] | 90 | 0.9634 | 0.42 | 10 | 0.9366 | 3.1 | 79 | 0.9610 | 32 |

[1]The low molecular weight ethylene homopolymer component was made with a chromium oxide based catalyst. This component had a HLMI/MI ratio less than 40. The high molecular weight ethylene-hexene copolymer component was also made with a chromium oxide based catalyst.
[2]The low molecular weight ethylene homopolymer component was made with a titanium chloride based catalyst. The high molecular weight ethylene-hexene copolymer component was also made with a titanium chloride based catalyst.
[3]The low molecular weight ethylene homopolymer component was made with a chromium oxide based catalyst. This component had a HLMI/MI ratio less than 40. The high molecular weight ethylene homopolymer component was made with a titanium chloride based catalyst.
[4]The low molecular weight ethylene homopolymer component was made with a chromium oxide based catalyst. This component had a HLMI/MI ratio greater than 100. The high molecular weight ethylene-hexene copolymer component was made with a titanium chloride based catalyst.

Comparing Polymer C1 to Polymer B1 it is apparent that polymer B1 has an ESCR which is much greater than the ESCR of Polymer C1. Furthermore, comparing Polymer C2 to Polymer B2 it is also apparent that Polymer B2 has an ESCR substantially greater than polymer C2.

The following can be observed from Table E5. Blend CB1 illustrates the importance of having the high molecular weight ethylene copolymer component made with a titanium chloride catalyst system. Blend CB2 illustrates the importance of having the low molecular weight ethylene homopolymer component made with a chromium oxide catalyst system. Blend CB3 illustrates the importance of having the high molecular weight ethylene component be a copolymer. Blend CB4 illustrates the importance of having a HLMI/MI ratio of the low molecular weight ethylene component be less than 40.

That which is claimed is:
1. A composition of matter comprising:
   (a) 30 to 70 weight percent of a low molecular weight ethylene homopolymer resin, where said resin is made by polymerizing ethylene with a chromium oxide based catalyst system, and where said resin has a density greater than 0.96 grams per cubic centimeter, a melt index greater than 30 grams per 10 minutes, a heterogeneity index from 2 to 35, and a high load melt index/melt index ratio less than 40,
   (b) 30 to 70 weight percent of a high molecular weight ethylene copolymer resin, where said resin is made by copolymerizing ethylene and an alpha-olefin with a titanium chloride based catalyst system, and where said resin has a density less than 0.955 grams per cubic centimeter, a high load melt index from 0.1 to 50 grams per 10 minutes, and a heterogeneity index from 2 to 10,
   where said weight percents are based on the total weight of said resins (a) and (b); and wherein said composition of matter has a melt index greater than 0.05 grams per 10 minutes and is essentially free of other ethylene polymers.

2. A composition according to claim 1 wherein said melt index of said low molecular weight ethylene homopolymer resin is from about 100 to about 400 grams per 10 minutes.

3. A composition according to claim 1 wherein said alpha-olefin is selected from the group consisting of propylene, 1-butene, 3-methyl-1-butene, 1-pentene, 3-methyl-1-pentene, 4-methyl-1-pentene, 1-hexene, 3-ethyl-1-hexene, and mixtures of two or more said alpha-olefins.

4. A composition according to claim 1 wherein said copolymer has a density from about 0.93 to about 0.95 grams per cubic centimeter.

5. A composition according to claim 1 wherein the weight percent of said low molecular weight ethylene homopolymer resin is from 45 to 50 weight percent.

6. A composition of matter comprising:
(a) 30 to 70 weight percent of a low molecular weight ethylene homopolymer resin, where said resin is made by polymerizing ethylene with a chromium oxide based catalyst system, and where said resin has a density greater than 0.96 grams per cubic centimeter, a melt index greater than 30 grams per 10 minutes, a heterogeneity index from 2 to 35, and a high load melt index/melt index ratio less than 40,
(b) 30 to 70 weight percent of a high molecular weight ethylene copolymer resin, where said resin is made by copolymerizing ethylene and an alpha-olefin with a titanium chloride based catalyst system, and where said resin has a density less than 0.955 grams per cubic centimeter, a high load melt index from 0.1 to 50 grams per 10 minutes, and a heterogeneity index from 2 to 10,
where said weight percents are based on the total weight of said resins (a) and (b); and
wherein said composition of matter has a melt index greater than 0.05 grams per 10 minutes and is free of other ethylene polymers.

7. A composition according to claim 6 wherein said melt index of said low molecular weight ethylene homopolymer resin is from about 100 to about 400 grams per 10 minutes.

8. A composition according to claim 6 wherein said alpha-olefin is selected from the group consisting of propylene, 1-butene, 3-methyl-1-butene, 1-pentene, 3-methyl-1-pentene, 4-methyl-1-pentene, 1-hexene, 3-ethyl-1-hexene, and mixtures of two or more said alpha-olefins.

9. A composition according to claim 6 wherein said copolymer has a density from about 0.93 to about 0.95 grams per cubic centimeter.

10. A composition according to claim 6 wherein the weight percent of said low molecular weight ethylene homopolymer resin is from 45 to 50 weight percent.

* * * * *